United States Patent
Kwun et al.

(10) Patent No.: US 9,414,328 B2
(45) Date of Patent: Aug. 9, 2016

(54) INTER-CELL INTERFERENCE COORDINATION METHOD AND APPARATUS FOR USE IN MOBILE COMMUNICATION SYSTEM

(71) Applicants: Samsung Electronics Co., Ltd., Suwon-si, Gyeonggi-do (KR); Korea Advanced Institute of Science and Technology, Daejeon (KR)

(72) Inventors: Jonghyung Kwun, Seoul (KR); Yeonjea Cho, Daegu (KR); Dongjo Park, Daejeon (KR); Sanguk Park, Seoul (KR); Wonchul Choi, Seoul (KR)

(73) Assignees: Samsung Electronics Co., Ltd., Suwon-si (KR); Korea Advanced Institute of Science and Technology, Daejeon (KR)

(*) Notice: Subject to any disclaimer, the term of this patent is extended or adjusted under 35 U.S.C. 154(b) by 125 days.

(21) Appl. No.: 14/074,090

(22) Filed: Nov. 7, 2013

(65) Prior Publication Data

US 2014/0128117 A1 May 8, 2014

(30) Foreign Application Priority Data

Nov. 7, 2012 (KR) .................. 10-2012-0125620

(51) Int. Cl.
*H04W 36/00* (2009.01)
*H04W 52/24* (2009.01)
*H04W 52/34* (2009.01)

(52) U.S. Cl.
CPC .......... *H04W 52/243* (2013.01); *H04W 52/346* (2013.01)

(58) Field of Classification Search
CPC . H04W 72/082; H04W 72/085; H04W 72/04; H04W 52/143; H04W 52/244
USPC ........................ 455/450, 451, 452.2
See application file for complete search history.

(56) References Cited

U.S. PATENT DOCUMENTS

| 2006/0094363 | A1 | 5/2006 | Kang et al. |
| 2009/0023466 | A1 | 1/2009 | Sutivong et al. |
| 2011/0045865 | A1 | 2/2011 | Viering et al. |
| 2013/0279403 | A1* | 10/2013 | Takaoka et al. ............... 370/328 |

FOREIGN PATENT DOCUMENTS

| EP | 2333980 A2 | 6/2011 |
| WO | 2011/041169 A1 | 4/2011 |

* cited by examiner

*Primary Examiner* — Tu X Nguyen
(74) *Attorney, Agent, or Firm* — Jefferson IP Law, LLP

(57) ABSTRACT

A data transmission and/or reception method of a base station in a wireless communication system is provided. The data transmission/reception method includes receiving information on interference measured by a terminal, allocating a downlink resource to a terminal based on the received interference information, determining per-subband transmit power distributions of the downlink resource allocation, and transmitting the per-subband transmit power distributions of the downlink resource allocation to neighbor base stations.

18 Claims, 8 Drawing Sheets

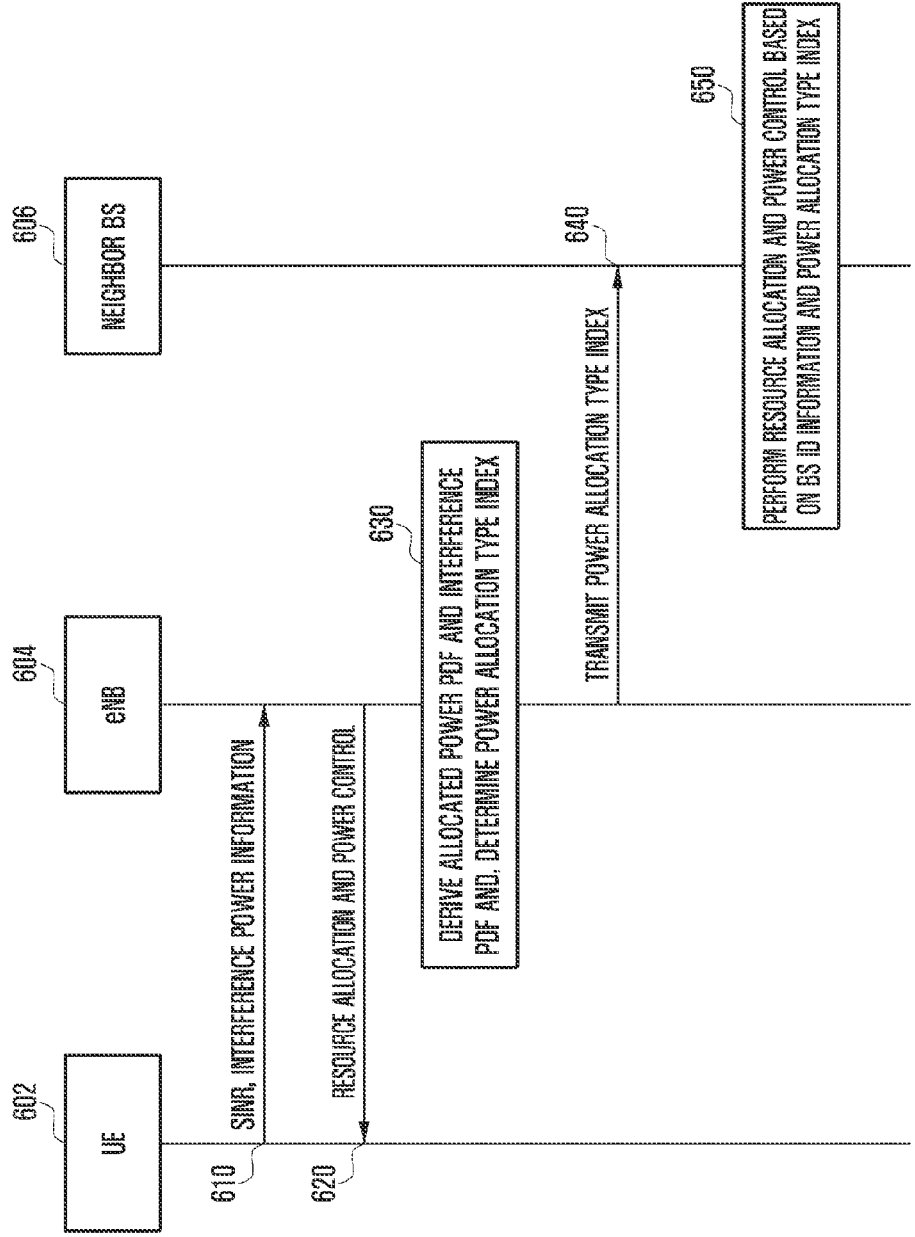

INTER-CELL INTERFERENCE COORDINATION METHOD AND APPARATUS FOR USE IN MOBILE COMMUNICATION SYSTEM

CROSS-REFERENCE TO RELATED APPLICATION(S)

This application claims the benefit under 35 U.S.C. §119 (a) of a Korean patent application filed on Nov. 7, 2012 in the Korean Intellectual Property Office and assigned Serial No. 10-2012-0125620, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) KOREA ADVANCED INSTITUTE OF SCIENCE AND TECHNOLOGY.

TECHNICAL FIELD

The present disclosure relates to an interference coordination method and apparatus for use in a mobile communication system. More particularly, the present disclosure relates to a method and apparatus for sharing information on the distribution of the interference and power allocation in exchanging inter-cell interference information.

BACKGROUND

In a wireless communication system, adjacent base stations, i.e. neighbor base stations, exchange power allocation information using a Relative Narrowband Transmit Power (RNTP) message. A Downlink RNTP (DL RNTP) is a message for interference coordination in the downlink and is transmitted through an X2 interface. In more detail, RNTP informs of whether the transmit power allocated per Resource Block (RB) is greater than a predetermined threshold using 1-bit indicator.

If the maximum transmit power of a RB, which may also be referred to as a Physical RB (PRB) that includes a predetermined number of subcarriers, is not greater than the threshold value, then the indicator is set to 0. This means that the RB is not allocated a power greater than the threshold, and thus, the base station may predict the low interference probability in the PRB.

Otherwise, if the maximum transmit power of the PRB is greater than the threshold, then the indicator is set to 1. In this case, a neighbor base station regards that the transmit power to be allocated to the corresponding PRB is not restricted, and thus, predicts high interference probability in the corresponding RB.

Accordingly, the neighbor base station determines that the RB, for which the indicator is set to 0, is less affected by interference, and thus, allocates the corresponding RB to a cell edge user. In contrast, the neighbor base station determines that the RB, for which the indicator is set to 1, is significantly affected by interference, and thus, allocates the corresponding RB to the cell center user with relatively low transmit power so as to mitigate the interference to neighbor cells. The interference information exchange increases the data transmission/reception overhead as the number of RBs increases due to the increase of the number of neighbor base stations or the increase of the available bandwidth. Also, this related-art method has a drawback in that it is difficult to perform accurate power allocation according to the location of the terminal within the cell. Accordingly, there is a need for an improved interference coordination method and apparatus for use in a mobile communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an inter-cell interference coordination method and apparatus that is capable of reducing interference information exchange overhead among the base stations and is capable of improving accuracy of power allocation information. Also, the present disclosure aims to provide an inter-cell interference coordination method that is capable solving the problem on the overhead occurring in the interference coordination among the base stations and the problem of the unsophisticated method of transmitting bitmap information on all of the RBs which has been acquired using the threshold value. Also, the present disclosure aims to provide an inter-cell interference coordination method and apparatus that is capable of performing interference coordination dynamically through a sophisticated mechanism while reducing the interference coordination signaling overhead among the small base stations. Also, the present disclosure aims to provide an inter-cell interference coordination method and apparatus that is capable of controlling the interference coordination signaling overhead by adjusting the system parameters of the base station. Furthermore, the present disclosure aims to provide an inter-cell interference coordination method and apparatus that is capable of performing interference coordination dynamically using wireless backhaul.

In accordance with an aspect of the present disclosure, a data transmission and/or reception method of a base station in a wireless communication system is provided. The method includes receiving information on interference measured by a terminal, allocating a downlink resource to a terminal based on the received interference information, determining per-subband transmit power distributions of the downlink resource allocation, and transmitting the per-subband transmit power distributions of the downlink resource allocation to neighbor base stations.

In accordance with another aspect of the present disclosure, a base station for transmitting data in a wireless communication system is provided. The base station includes a transceiver configured to transmit information on interference measured by a terminal and a controller configured to allocate a downlink resource to the terminal based on the received interference information and configured to determine per-subband transmit power distributions of the downlink resource allocation, wherein the transceiver is configured to transmit the per-subband transmit power distributions of the downlink resource allocation to neighbor base stations.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a signal flow diagram illustrating a procedure of exchanging interference information among eNBs and a User Equipment (UE) in an inter-cell interference coordination method according to an embodiment of the present disclosure;

Throughout the drawings, like reference numerals will be understood to refer to like parts, components, and structures.

DETAILED DESCRIPTION

Figure 1:
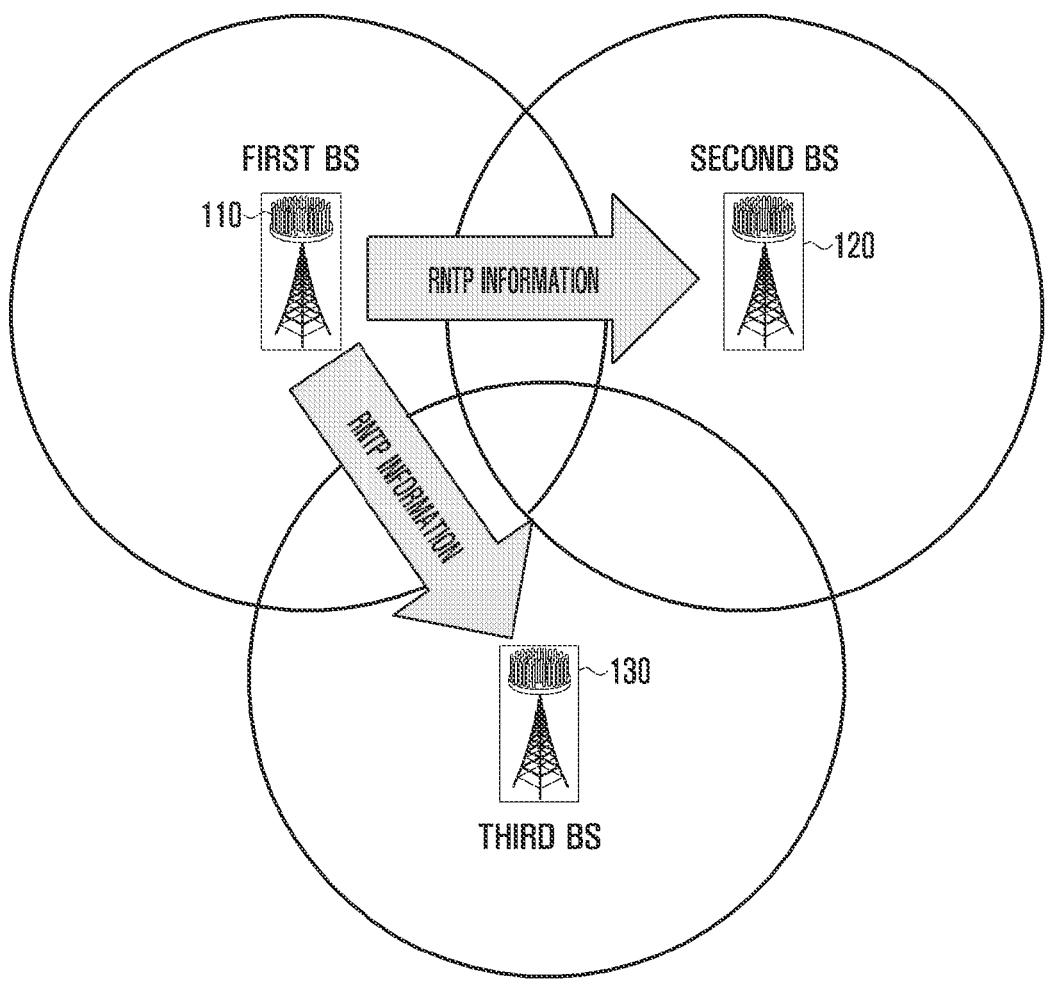
FIG. 1 is a diagram illustrating a network environment for explaining interference coordination signaling among enhanced NodeBs (eNBs) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those shown in drawings, in practice. The same reference numbers are used throughout the drawings to refer to the same or like parts.

In the following description, a transmit power for a Resource Block (RB), which is allocated by the base station, which may also be referred to as an evolved Node B (eNB), and the distribution of interferences caused by neighbor base stations may be referred to as a Probability Density Function (PDF).

Embodiments of the present disclosure are described in detail with reference to the accompanying drawings hereinafter.

FIG. 1 is a diagram illustrating a network environment for explaining an interference coordination signaling among eNBs according to an embodiment of the present disclosure.

Referring to FIG. 1, the wireless communication system may include at least one eNB 110, 120, and 130. The eNBs 110, 120, and 130 may communicate data with the terminals within respective service coverage areas. A service coverage area may be referred to as a cell and/or cell area. The eNBs 110, 120, and 130 may have intersections of cell areas in which a communication error probability is high due to the inter-cell interference. In order to reduce the communication error probability caused by inter-cell interference, the eNBs 110, 120, and 130 may exchange interference information.

The interference information may be included in a Relative Narrowband Transmit Power (RNTP) message. In an embodiment of the present disclosure, the first base station 110 may transmit per-subband transmit power indicators to the second and third base stations 120 and 130. The per-subband transmit power indicator is set to a value indicating whether a per-RB transmit power, allocated by the first base station, is greater than a predetermined threshold value. In more detail, if the transmit power allocated for a certain RB is not greater than the threshold value, then the transmit power indicator is set to 0. Otherwise, if the transmit power allocated for the RB is greater than the threshold value, then the transmit power indicator is set to 1. If the RNTP message is received, then each of the second and third base stations 120 and 130 predicts the interference probability based on the RNTP message and allocates the transmit power for the RB based on the predicted interference probability.

In more detail, if the transmit power indicator is set to 0 for a certain RB, then the transmit power allocated for the RB is not greater than the threshold, and thus, the neighbor base station predicts that the interference probability in the RB is low. Accordingly, if the RNTP message is received, then the neighbor eNB may allocates the RB to the terminal based on the prediction result. According to an embodiment of the present disclosure, the RB having a low interference probability may be allocated to a terminal located at a boundary of the cells, thus reducing interference between adjacent eNBs and improving communication reliability thorough exchange of RNTP information.

Figure 2:
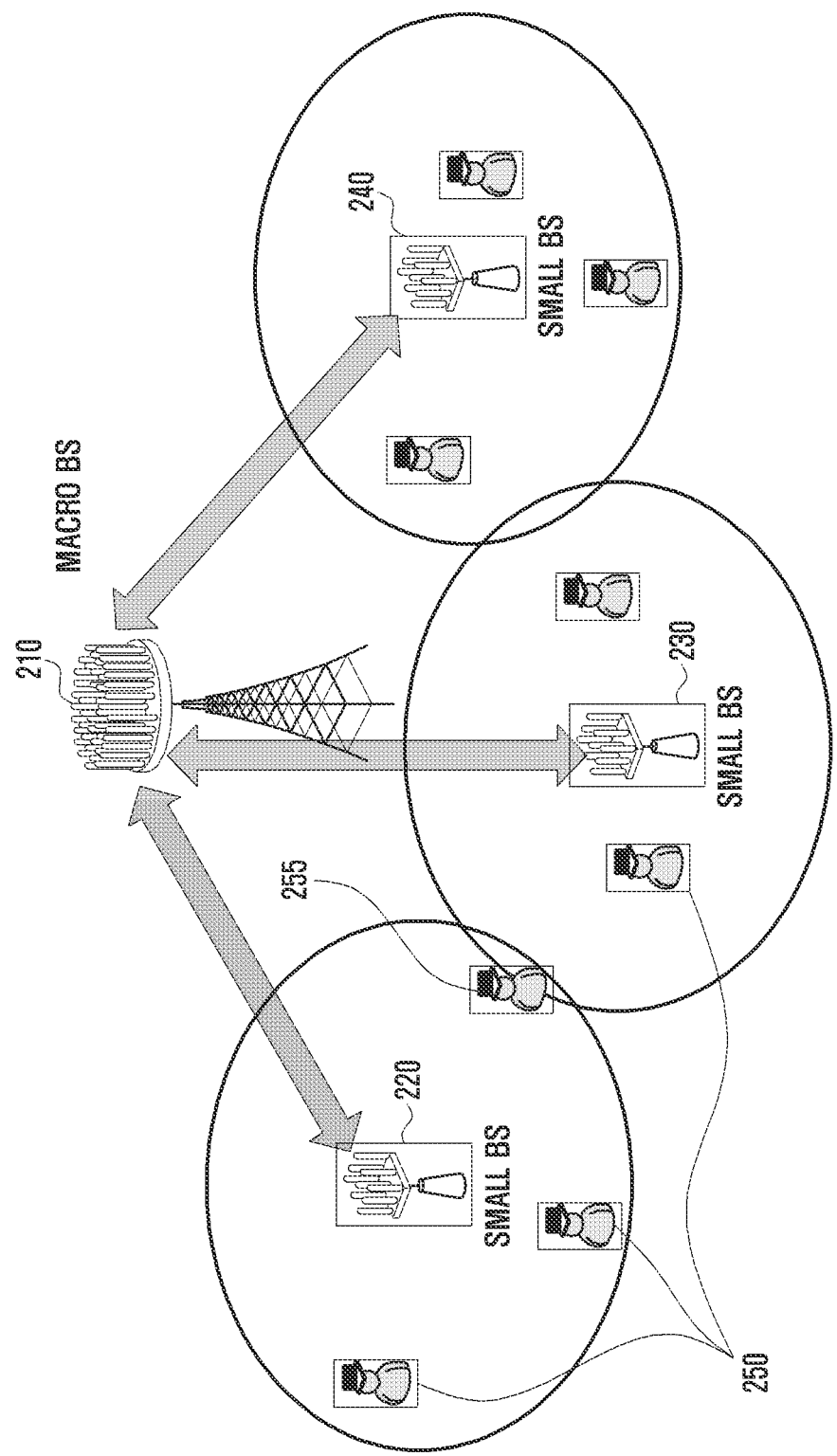
FIG. 2 is a diagram illustrating a mobile communication environment according to an embodiment of the present disclosure.

FIG. 2 is a diagram illustrating a mobile communication environment according to an embodiment of the present disclosure.

Referring to FIG. 2, a communication system according to an embodiment of the present disclosure includes a macro eNB 210 and a plurality of femto eNBs 220, 230, and 240. The macro eNB 210 and the femto eNBs 220, 230, and 240 are connected through wired and/or wireless communication links. According to an embodiment of the present disclosure, the macro eNB 210 and the femto eNBs 220, 230, and 240 are connected through wireless backhaul communication links.

The femto eNB 220, 230, and 240 may provide a terminal, which may also be referred to as a User Equipment (UE), with a data communication service within their respective cells. According to an embodiment of the present disclosure, the femto eNBs 220, 230, and 240 communicate data with UEs 250.

According to an embodiment of the present disclosure, a UE 255, which is located at a cell boundary region formed by the femto eNBs 220 and 230, has a high data communication error probability due to the interference caused by the signals transmitted by the eNBs 220 and 230, and thus, there is a need to share interference information, in addition to the RNTP information, among the eNBs 220, 230, and 240 in order to reduce the error probability. An embodiment of the present disclosure proposes a method for sharing accurate per-RB transmit power information and per-RB interference information among the eNBs 220, 230, and 240. In more detail, the eNBs 220, 230, and 240 share the interference strength and power allocation type, as reported by a UE, in order to coordinate interference among the eNBs 220, 230, and 240. Although the embodiment illustrated in FIG. 2 is directed to the interference coordination among femto cells, the present disclosure is not limited thereto, and the interference coordination, according to an embodiment of the present disclosure, may be executed by any similar and/or suitable type of base station and/or network equipment.

In an embodiment of the present disclosure, each of the UEs and the eNBs may include a transceiver for executing data communication via Radio Frequency (RF) signal transmission and/or reception and a control unit for performing operations on the data received and to be transmitted by the transceiver and controlling the transceiver.

Figure 3:
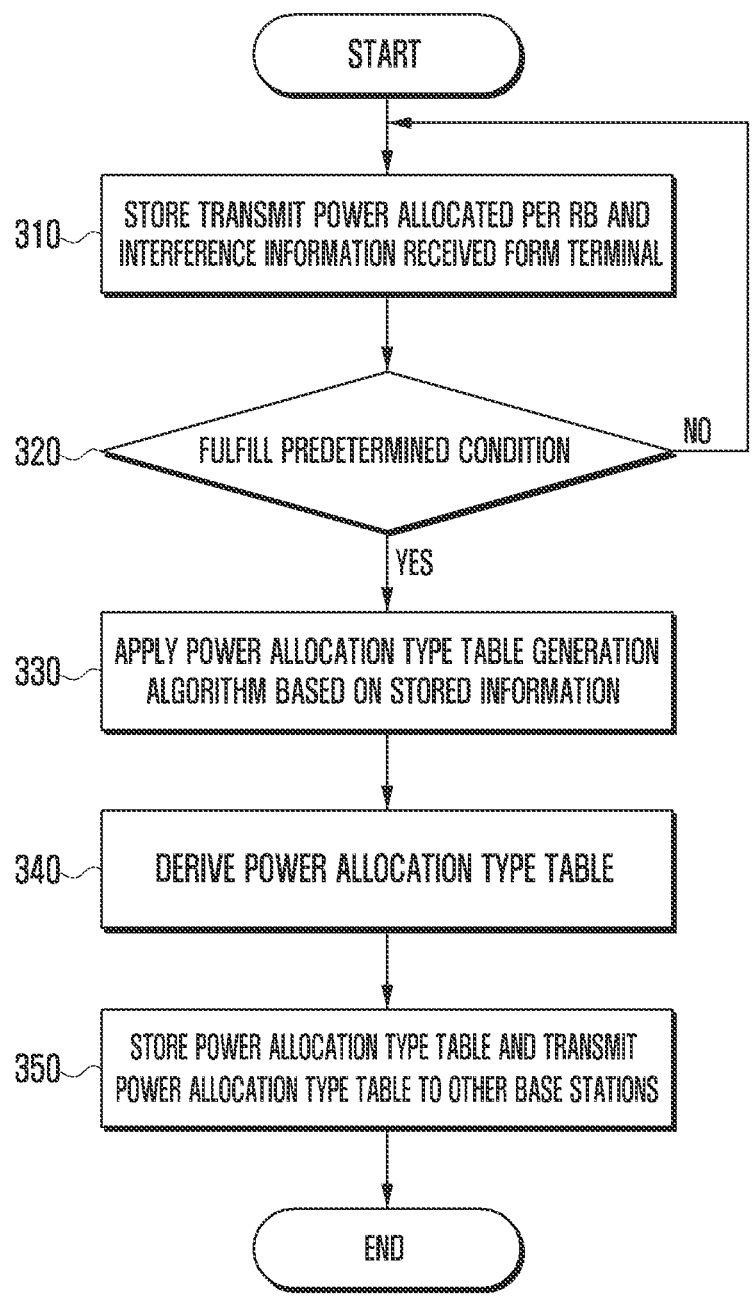
FIG. 3 is a flowchart illustrating a procedure of generating a power allocation type table for use in an inter-cell interference coordination method according to an embodiment of the present disclosure.

FIG. 3 is a flowchart illustrating a procedure of generating a power allocation type table for use in an inter-cell interference coordination method according to an embodiment of the present disclosure.

Referring to FIG. 3, an eNB may store at least one of a per-RB transmit power allocated to the UE and interference information received from the UE at operation 310.

The per-RB transmit power includes information on a transmit power level per RB for transmissions from the eNB to the UE within the cell. The per-RB transmit power may be determined based on at least one of the power allocation information of a neighbor eNB and the interference information reported by the UE. However, the present disclosure is not limited thereto, and the transmit power may be determined according to and/or based on any suitable type of information for determining the transmit power. For example, the per-RB transmit power may be configured based on a value predetermined by the eNB. The allocated transmit power level may be quantized in order to be stored, and the quantization degree may be changed depending on the embodiment and, in this embodiment, the transmit power level is preferably quantized into a 4 to 6-bit value in the entire transmit availability range. However, the present disclosure is not limited thereto, and the transmit power level may be quantized into a value having any suitable and/or similar number of bits.

The interference information received from the UE may include at least one of a Channel Quality Indicator (CQI) and a Signal to Interference plus Noise Ratio (SINR). The UE may measure the interference power of the neighbor eNB at its location at and/or during an interval of time, frequency, and/or signal transmission units. The UE may transmit a signal, including the information on the measured interference power, to the eNB. The interference power information may be quantized, preferably into a 4 to 6-bit value, to be transmitted to the eNB.

The eNB determines whether at least one of the distribution of the per-RB transmit power and the interference information fulfills a predetermined condition at operation 320. The condition may be determined such that the power allocated per RB or the received interference signal values have meaningful distribution when view over and/or with respect to a predetermined number of measurements. The condition may be determined dynamically depending on the system. A number of the power allocation types may be increased to acquire a more accurate power allocation type or the number of the power allocation types may be decreased to reduce the overhead. The condition may correspond to at least one of the information on the transmit power allocated per RB and the interference information received from the UE.

The eNB, at operation 330, may use a generation algorithm for generating a power allocation type table based on the information received in operation 310. In this way, it is possible to extract at least one of a power allocation information and an interference information type capable of having the most types based on the stored information.

According to an embodiment of the present disclosure, it is possible to store M training vectors, as follows, at operation 310. The training vectors may include a sum of per-RB interference amounts and a sum of per-RB transmit power levels and the training vectors may be expressed as follows.

$$\mathcal{T} = \{x_1, x_2, \ldots, x_M\}.$$

Here, vector x denotes all RBs and may have dimensions as many as the number of RBs (k). M may be a value large enough to be able to check the statistical characteristic of vector x. Accordingly, a set of power allocation types may be expressed as follows.

$$\mathcal{C} = \{c_1, c_2, \ldots, c_N\}, \ c_n = (c_{n,1}, c_{n,2}, \ldots, c_{n,k}), \ n=1, 2, \ldots, N.$$

Here, the power allocation type vector c has k dimensions equal to the number of RBs. $S_n$ may be defined as encoding area related to a specific power allocation type $c_n$. Also, a set of all partitions is expressed as follows.

$$\mathcal{P} = \{S_1, S_2, \ldots, S_N\}.$$

Then the proximity vector of the derived power allocation type $x_m$ expressed as $Q(x_m)$ may be expressed as $c_n$.

$$Q(x_m) = c_n, \text{ if } x_m \in S_n.$$

As a consequence, the average distortion expressed with the Mean Square Error (MSE) may be expressed as follows.

$$D_{ave} = \frac{1}{Mk} \sum_{m=1}^{M} \|x_m - Q(x_m)\|^2,$$

where, $$\|e\|^2 = e_1^2 + e_2^2 + \ldots + e_k^2.$$

In determining the power allocation type, a design objective, according to an embodiment of the present disclosure, is to find $\mathcal{C}$ and $\mathcal{P}$ minimizing $D_{ave}$ for the given $\mathcal{T}$ and N.

Nearest Neighbor Condition:

$$S_n = \{x : \|x - c_n\|^2 \leq \|x - c_{n'}\|^2 \forall n' = 1, 2, \ldots, N\}$$

(2) Centroid Condition:

$$c_n = \frac{\sum_{x_m \in S_n} x_m}{\sum_{x_m \in S_n} 1} n = 1, 2, \ldots, N.$$

According to an embodiment of the present disclosure, in order to derive the power allocation type table fulfilling the above conditions, a Linde-Buzo-Gray (LBG) VQ algorithm should be applied as a Vector Quantization (VQ) design algorithm. This algorithm may be an iterative algorithm capable of being performed iteratively in order to obtain an ideal solution.

At operation 340, the eNB derives the power allocation type table based on the result value of the algorithm applied at operation 330. The table may be generated dynamically according to the embodiment. The number of tables may be increased in order to determine a more precise power allocation type or may be decreased in order to reduce the transmission overhead.

The eNB stores the derived power allocation type table and transmits the signal, including information on the derived power allocation type table, to other eNBs at operation 350. The table information may include a power allocation type index and, as a consequence, the eNBs may notify of the power allocation types by exchanging the index value.

Through iterative training vector collection, the table may be determined according to at least one of per-RB power allocation types and measured interference power types.

Figure 4:
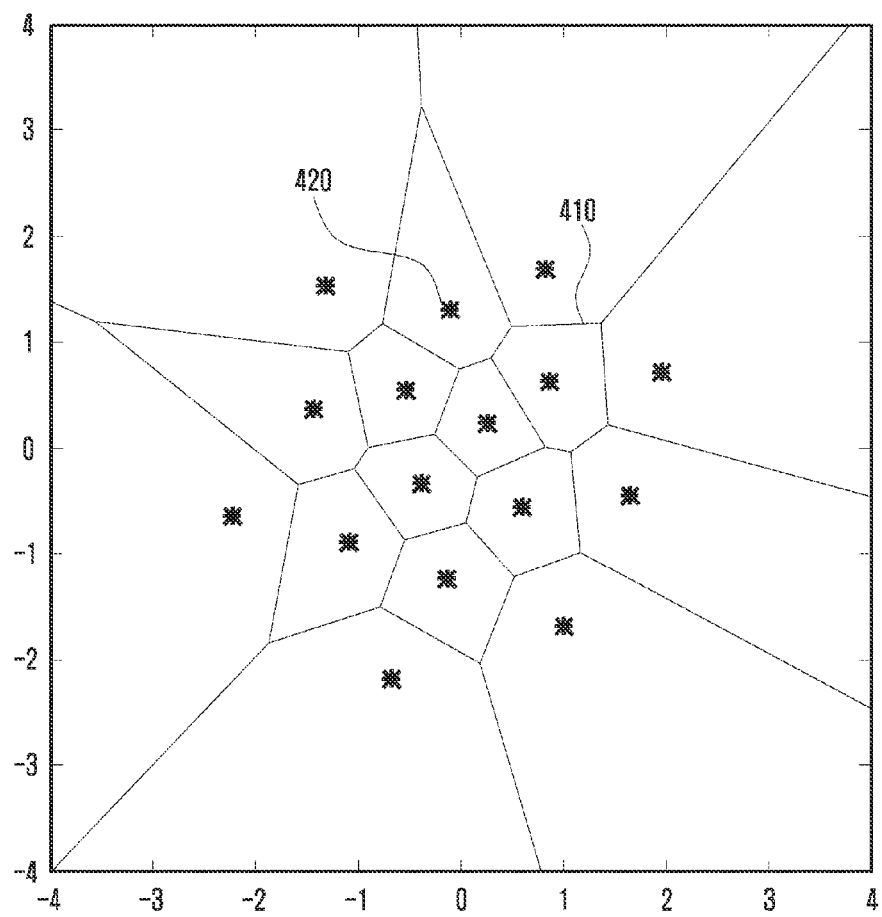
FIG. 4 is a diagram illustrating a concept of determining a power allocation type table for use in an inter-cell interference coordination method according to an embodiment of the present disclosure.

FIG. 4 is a diagram illustrating a concept of determining a power allocation type table for use in an inter-cell interference coordination method according to an embodiment of the present disclosure.

Referring to FIG. 4, a code vector 420 indicates a power allocation type, and an encoding region 410 includes boundaries of different power allocation types. In the embodiment of FIG. 4, the code vector 420 is 2 dimensional, and a number of power allocation type tables N is 16. However, the present disclosure is not limited thereto, and the code vector 420 may have any suitable and/or similar number of dimensions, such as a number of dimensions equal to the number of RBs, and the number of power allocation type tables varies according to an accuracy needed by the system. N may be set to a large value for more fine classification of types or may be set to a small value for reducing the transmission overhead. In this way, it is possible to determine different power allocation type tables.

According to another embodiment of the present disclosure, the elements of which values are greater than a predetermined threshold value, from among the elements of the training vector, is multiplied by relatively high weight values. By applying this procedure to all the training vectors, the training vector set is reconfigured. This is because the elements having values greater than the threshold value are needed to be considered with priority due to their high interference probability to the neighbor eNB.

The eNB generates a PDF table using the training vector set that is newly configured. The index of the power allocation type of the actual input vector, per-RB power allocation information, is determined using the input vector reconfigured by multiplying a relatively high weight value to the elements having the values equal to or greater than the predetermined threshold value. Here, the relatively high weight value makes the elements more sensitive to the information on the dominant interference elements from the view point of the neighbor cell in generating the PDF table, i.e. the code vectors. The total MSE values and the sensitivity of interference elements have a tradeoff relationship. Accordingly, an appropriate weight value should be determined. The threshold is the parameter that is a condition for determining the dominant interference from the view point of the neighbor eNB affected by the interference. According to an embodiment, using a predetermined threshold value may be considered when the eNB determines the power allocation type index afterwards, as well as when generating the PDF table.

On the basis of the power allocation information or interference information collected as described above, it is possible to extract N types of PDF tables. According to an embodiment of the present disclosure, the number of types of PDF tables, N, and respective types may be different depending on the femto eNB. Since the number of types of PDF tables, N, is in proportion to the inter-cell interference coordination accuracy and has a tradeoff relationship with the complexity and overhead, it may be used as a meaningful design parameter configurable according to the operator's necessity. The PDF type index information transmitted for interference coordination among the femto eNBs may be indicated by a specific bit.

The method for determining the index of the power allocation type, similar to the distribution of the measured power allocation, may be expressed as follows:

$$\hat{i} = \underset{i \in C}{\mathrm{argmin}} D(c_i \| x)$$

where $$D(c_i \| x) = \sum_{j=1}^{k} c_{i,j} \cdot \log \frac{c_{i,j}}{x_j}.$$

The above equation may be referred to as a "Relative entropy" or a "Kullback-Leibler distance", and $\hat{i}$ denotes the index of the intended power allocation type. This means that the PDF type in the table having the currently derived PDF X and the least "Relative entropy" value is $c_{\hat{i}}$. In order to find $c_{\hat{i}}$, it is possible to use an MSE-based method.

$$\hat{i} = \underset{i \in C}{\mathrm{argmin}} \|c_i - x\|_2^2.$$

With the above equation, the eNB may determine the index of the power allocation type most similar to the power allocation distribution measured by the eNB.

Figure 5:
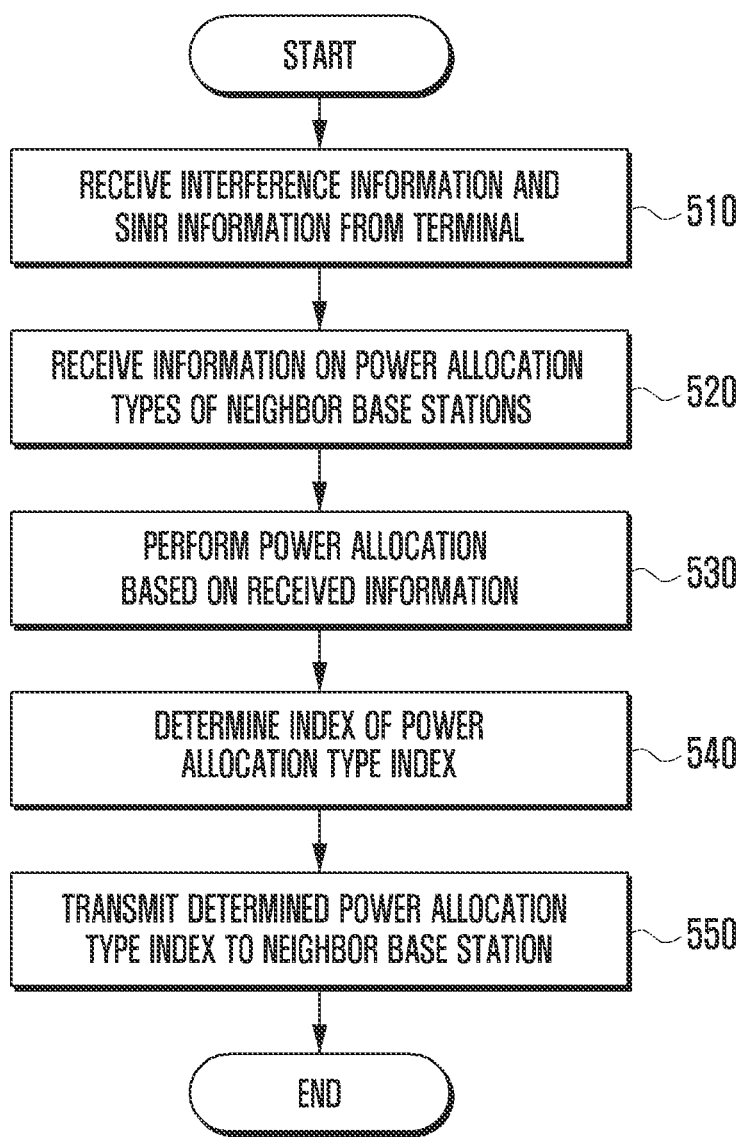
FIG. 5 is a flowchart illustrating a procedure for an eNB to allocate power and transfer interference information to neighbor eNBs in an inter-cell interference coordination method according to an embodiment of the present disclosure.

FIG. 5 is a flowchart illustrating a procedure for an eNB to allocate power and transfer interference information to neighbor eNBs in an inter-cell interference coordination method according to an embodiment of the present disclosure.

Referring to FIG. 5, the eNB receives a message, including at least one of the interference information and SINR information, from the UE at operation 510. The message may be the signal indicating per-RB interference levels. The eNB may receive the information from one or more UEs and may store the information to be respective to the UE. In detail, the eNB may store a sum of values indicating the interference levels on respective subbands including and/or included in the RB.

According to an embodiment of the present disclosure, the eNB may receive the interference information from the UE. The UE may measure the interference power of neighbor eNBs per RB at its position. The UE may quantize the measured interference and may transmit the quantized measurement value to the eNB. If needed, the UE performs interference detection using an appropriate threshold value in order to reduce the feedback amount in the form of a bitmap of Os and is in reporting the interference information. The eNB sums the interference powers based on the per-RB interference information received from the UE and derives the PDF based on the sum of the interference power. According to various embodiments, the PDF may be the function indicating the sum of the per-subband interferences. By comparing the derived PDFs, it is possible to determine the similar types of interferences.

The eNB may receive the information on the power allocation types of the neighbor eNBs at operation 520. According to an embodiment of the present disclosure, operation 520 may be performed selectively. In the case that the eNB allocates transmit power to the UE initially, then the eNB may have no power allocation type information of the of the neighbor eNBs. The power allocation type information may be a value indicating the index of a specific type from among the received power allocation type subsets. The eNB may reduce the data amount needed for receiving the power allocation information of the neighbor eNBs.

At operation 530, the eNB may allocate transmit power to the UE based on at least one of the information received at operation 510 and at operation 520. The transmit power allocation may include the power allocation for downlink transmission from the eNB to the UE. According to an embodiment of the present disclosure, in the case of a subband having an RB for which significant interference is predicted based on the information received at operations 510 and 520, the error probability may be reduced by allocating the corresponding RB to a UE that is close to the eNB.

The eNB may determine the index of the allocated per-subband power allocation type at operation 530. The operation of determining the index of the power allocation type may include determining an index of the type by selecting a power allocation type most similar to the power allocation type obtained inductively through the procedure described with reference to FIG. 3. According to an embodiment, even in the case where the distribution of the power allocation, performed at operation 530, mismatches a predetermined power allocation type, the eNB may select the index of the type having the least value of the sum of the average power differences in the determined power allocation type table. According to an embodiment, if the allocated power is equal to or greater than a predetermined threshold value, then the index of the power allocation type may be determined by finding a subset of the similar power allocation types with priority by applying a weight higher than that of the subband that has been allocated power greater than the threshold value and by selecting the power allocation type similar to that of the subband that has been allocated power less than the threshold value in the subset. At operation 540, the eNB determines the power allocation type index.

At operation 550, the eNB may transmit the power allocation type index, as determined at operation 540, to the neighbor base station. Afterwards, the neighbor base station may allocate downlink transmit power to the UE within its coverage based on the received power allocation type index.

FIG. 6 is a signal flow diagram illustrating a procedure of exchanging interference information among eNBs and UE in an inter-cell interference coordination method according to an embodiment of the present disclosure.

Referring to FIG. 6, a UE 602 sends the eNB 604 at least one of the SINR information, measured at a current location of the UE 602, and interference power information received from the neighbor base stations including the neighbor base station 606 at operation 610. The UE may perform measurement per subband and may quantize the measurement result selectively for transmission.

At operation 620, the eNB 604 may adjust the resource and transmit power allocation to the UE 602, and inform the UE 602 of the adjustments, based on the information received at operation 610.

At operation 630, the base station 604 may derive at least one of the allocated power PDF and interference PDF based on at least one of the information transmitted at operation 620. Also, in operation 630, he eNB 604 may determine the index of the power allocation type similar to the allocated power PDF or the interference PDF. The eNB 604 may determine the index of the power allocation type similar to the currently allocated power PDF or interference PDF in the previously acquired PDF table according to an embodiment of the present disclosure. According to an embodiment of the present disclosure, the eNB 604 may determine the index of the power allocation type in consideration of the power allocation value of the subband which is equal to or greater than a predetermined threshold value with priority.

According to another embodiment, the subband, including an entirety of the RB, may be divided into plural subsets, the indices of the power allocation tables for the respective subsets may be obtained, and the indices of the respective subsets may be determined.

At operation 640, the base station 604 may transmit, to the neighbor base station 606, the information including the power allocation type index determined at operation 630 and the ID of the eNB 604.

At operation 650, the neighbor base station 606 allocates at least one resource to the UE based on the information received at operation 640 and performs power control for downlink transmission.

Figure 7B:
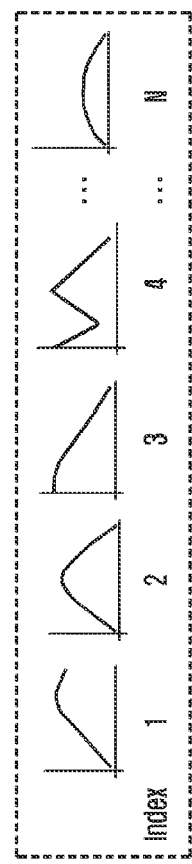
FIGS. 7A and 7B are diagrams illustrating a graph of a Probability Density Function (PDF) and power allocation types for explaining an inter-cell interference coordination method according to an embodiment of the present disclosure.
Figure 7A:
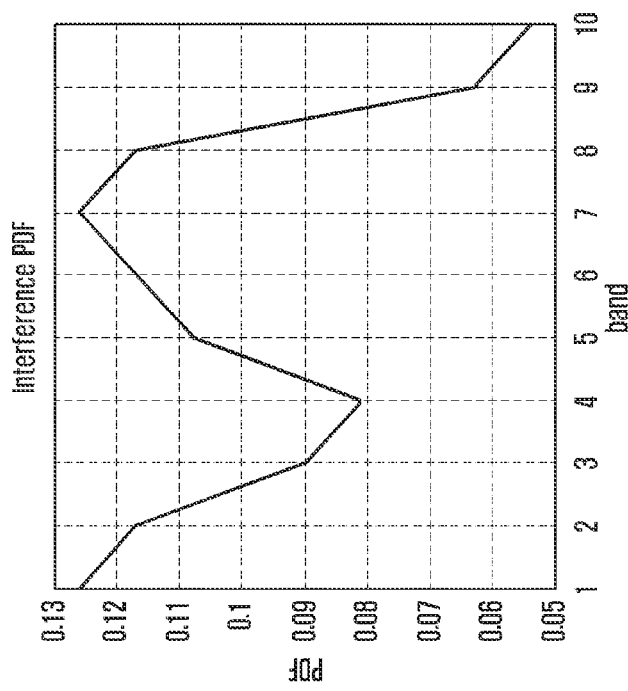

FIGS. 7A and 7B are diagrams illustrating a graph of PDF and power allocation types for explaining an inter-cell interference coordination method according to an embodiment of the present disclosure.

Referring to FIG. 7A, a graph of per-subband PDF values measured by the eNB is illustrated. In the graph, the horizontal axis denotes the subband index and the vertical axis denotes a relative value of interference power. According to an embodiment of the present disclosure, the value on the vertical axis may indicate a relative ratio to the measured maximum interference power.

Referring to FIG. 7B, the power allocation types determined according to the interference power measured by the eNB in advance or the predetermined power allocation type is illustrated.

FIG. 7A shows the PDF of the interference measured by the eNB. The eNB determines the interference allocation type similar in shape to a power allocation type from among the pre-stored power allocation types, as shown in FIG. 7B. Since the power allocation type of index 4 is most similar, from among the interference types of FIG. 7B, the eNB selects the index 4 of the interference allocation type and transmits the selected index to the neighbor base station.

Figure 8:
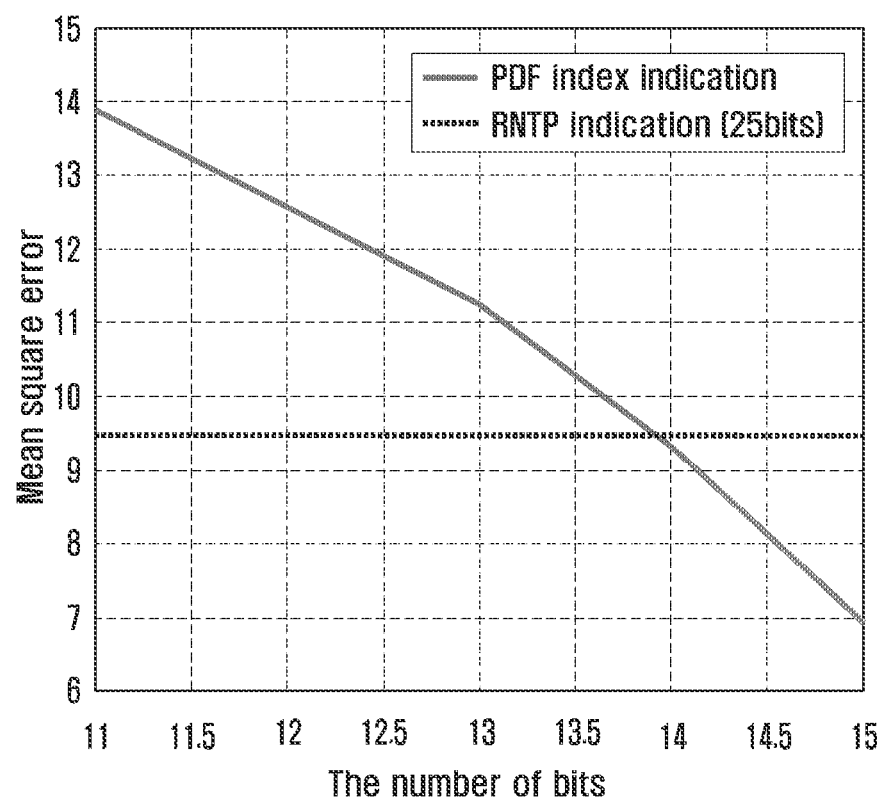
FIG. 8 is a graph illustrating a simulation result for comparing performances of a method using interference information exchange according to an embodiment the present disclosure and a method using a Relative Narrowband Transmit Power (RNTP) based interference information exchange.

FIG. 8 is a graph illustrating a simulation result for comparing performances of a method using interference information exchange according to the present disclosure and a method using RNTP based interference information exchange.

Referring to FIG. 8, the changes of MSE in the transmission method of using the power allocation type index of the present disclosure and the transmission method of using 25-bit RNTP indicator is shown.

In the graph, the vertical axis denotes a MSE and the horizontal axis denotes a number of bits used for transmitting the power allocation type index. As the number of bits used in transmitting the power allocation type index increases, more distinct power allocation types may be transmitted so as to control interference more finely.

Compared to the method of using the 25-bit RNTP indicator, the information transmission method of the present disclosure is capable of transmitting the data with less MSE when the number of bits is equal to or greater than 14. Accordingly, the present disclosure is capable of reducing the MSE while using a relatively small number of bits for interference information transmission.

The inter-cell interference coordination method and apparatus of the present disclosure is capable of exchanging power allocation type information among adjacent base station so as to improve interference control efficiency using a small number of bits. Also, the inter-cell interference coordination method and apparatus of the present disclosure is capable of recommending power allocation information type so as to adjust the number of bits for transferring interference information dynamically. Also, the inter-cell interference coordination method and apparatus of the present disclosure is capable of reducing the information amount for interference coordination even when the interference coordination is performed through wireless backhauls among the small base stations, resulting in a reduction of overhead. Furthermore, the inter-cell interference coordination method and apparatus of the present disclosure is capable of reducing the overhead of signaling interference information between the small base station, such as a home NodeB, and the macro base station.

It is to be appreciated that those skilled in the art can change or modify the embodiments without departing the technical concept of this disclosure. Accordingly, it should be understood that above-described embodiments are essentially for illustrative purpose only but not in any way for restriction thereto. Thus the scope of the disclosure should be determined by the appended claims and their legal equivalents rather than the specification, and various alterations and modifications within the definition and scope of the claims are included in the claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A data transmission and/or reception method of a base station in a wireless communication system, the method comprising:
   receiving information on interference measured by a terminal;
   allocating a downlink resource to a terminal based on the received interference information;
   selecting a type of transmission power distribution of the downlink resource allocation among a plurality of types of transmission power allocation distributions based on at least one of the received interference information and the downlink resource allocation; and
   transmitting information related to the selected type of the transmission power distribution of the downlink resource allocation to neighbor base stations,
   wherein each of the type of transmission power allocation distributions corresponds to at least two subbands.

2. The method of claim 1, wherein the selecting of the type of the transmission power allocation distribution of the downlink resource allocation comprises selecting a type of transmission power allocation distribution most similar to a transmission power distribution type that is allocated to the terminal from among the predetermined among the plurality of transmission power allocation distribution types.

3. The method of claim 2, wherein the selecting of the type of the transmission power allocation distribution of the downlink resource allocation further comprises identifying at least one subband among the at least two subbands,
   wherein transmission powers equal to or greater than a predetermined threshold value is allocated to the at least one subband, and
   wherein the type of transmission power allocation distribution most similar to the transmission power distribution is selected based on the identified at least one subband.

4. The method of claim 1, wherein the selecting of the type of the transmission power distributions of the downlink resource allocation comprises:
   sorting the at least two subbands, for resource allocation of the base station, into at least two subsets; and
   determining transmission power distributions for the at least two subsets.

5. The method of claim 1, further comprising receiving information related to at least one type of transmission power distribution of the downlink resource allocation of the neighbor base stations from the neighbor base stations,
   wherein the allocating of the downlink resource to the terminal comprises allocating the downlink resource to the terminal based on the information related to the at least one type of transmission power distribution of the downlink resource allocation of the neighbor base station and the interference information.

6. The method of claim 1, wherein the receiving of the interference information comprises receiving at least one of a channel quality signal indicator (CQI) and a signal to interference plus noise ratio (SINR) measured by the terminal.

7. The method of claim 1, further comprising:
   determining the plurality of types of transmission power allocation distributions.

8. The method of claim 1, wherein the information related to the selected type of the transmission power distributions of the downlink resource allocation comprises an index value corresponding to the selected type of the transmission power distribution of the downlink resource allocation.

9. The method of claim 1, wherein the information related to the selected type of the transmission power distribution of the downlink resource allocation comprises identification information of the base station.

10. A base station for transmitting and receiving data in a wireless communication system, the base station comprising:
    a transceiver configured to receive information on interference measured by a terminal; and
    a controller configured to:
       allocate a downlink resource to the terminal based on the received interference information, and
       select a type of transmission power distribution of the downlink resource allocation among a plurality of types of transmission power allocation distributions based on at least one of the received interference information and the downlink resource allocation, wherein the transceiver is configured to transmit information related to the selected type of the transmission power distribution of the downlink resource allocation to neighbor base stations, wherein each of the types of transmission power allocation distributions corresponds to at least two subbands.

11. The base station of claim 10, wherein the controller is further configured to select the type of transmission power allocation distribution most similar to a transmission power distribution type that is allocated to the terminal from among the plurality of transmission power allocation distribution types.

12. The base station of claim 11, wherein the controller is further configured to:

identify at least one subband among the at least two subbands, wherein transmission powers equal to or greater than a predetermined threshold value is allocated to the at least one subband, and wherein the type of transmission power allocation distribution most similar to the transmission power distribution is selected based on the identified at least one subband.

13. The base station of claim 10, wherein the controller is further configured to:

sort the at least two subbands for resource allocation of the base station into at least two subsets, and determine transmission power distributions for the at least two subsets.

14. The base station of claim 10, wherein the transceiver is further configured to:

receive information related to at least one type of transmission power distribution of the downlink resource allocation of the neighbor base stations from the neighbor base stations, and allocate the downlink resource to the terminal based on the information related to at least one type of the transmission power distribution of the downlink resource allocation of the neighbor base station and the interference information.

15. The base station of claim 10, wherein the transceiver is further configured to receive at least one of a channel quality signal indicator (CQI) and a signal to interference plus noise ratio (SINR) measured by the terminal.

16. The base station of claim 10, the controller is further configured to determine the plurality of types of transmission power allocation distributions.

17. The base station of claim 10, wherein the information related to the selected type of the transmission power distribution of the downlink resource allocation comprises an index value corresponding to the selected type of the transmission power distribution of the downlink resource allocation.

18. The base station of claim 10, wherein the information related to the selected type of the transmission power distribution of the downlink resource allocation comprises identification information of the base station.

* * * * *